United States Patent Office 2,993,933
Patented July 25, 1961

2,993,933
SIMULTANEOUS PREPARATION OF ORGANO-BORON COMPOUNDS AND SEPARATION OF INTERNAL OLEFINS FROM α-OLEFINS
Herbert C. Brown, 1840 Garden St., West Lafayette, Ind.
No Drawing. Filed May 28, 1958, Ser. No. 738,308
7 Claims. (Cl. 260—606.5)

This application relates to the selective conversion of mixtures of olefins into primary organo boranes and simultaneous separation of internal olefins from α-olefins.

In the present commercial petroleum refinery techniques, hydrocarbon streams are obtained in various steps of the process which are quite complex and contain terminal or α-olefins and internal olefins, that is where the double bond is not between the first and second carbon atoms of the hydrocarbon chain. The terminal olefins are far more valuable than are the internal olefins. Known procedures for treating such hydrocarbon streams or olefin mixtures, however, result in selective reaction with the internal olefins leaving the α-olefin still in admixture with other hydrocarbons in the stream. For example, treatment of a mixture of olefins with sulfuric acid results in the selective reaction with the 2- and other internal olefins in preference to reaction with the 1- or α-olefins. Treatment with halogens, especially bromine, also results in such selective reaction with the internal olefins. An undesirable feature of such treatments is that the hydrocarbon stream still contains the α-olefin which contributes more greatly to the instability, gum forming tendency and to lower antiknock value of the stream. Hence, a technique whereby the α-olefin is utilized efficiently and obtained in a form having other use and which would simultaneously result in the separation of internal olefins from the α-olefin resulting, in the case of hydrocarbon streams, in a fuel of greater antiknock quality and stability characteristics would be highly desirable.

Accordingly, it is an object of this invention to provide a method for the separation of terminal or α-olefins from internal olefins. A further object is to provide a method whereby hydrocarbon streams containing α-olefins and internal olefins are treated for removal of the α-olefins producing a hydrocarbon stream having superior qualities. A particular object of this invention is the simultaneous production of terminal organo boron compounds and separation of α-olefins from internal olefins. These and other objects will be evident as the discussion proceeds.

The process of this invention comprises the reaction of diborane with a mixture containing α-olefins and internal olefins. In general, the reaction is conducted at a temperature between about 0° C. and 150° C. although temperatures between about 25–50° C. are preferred for enhancing selectivity and preferential reaction of the diborane with the α-olefin. The mixture of internal and α-olefins can also contain other materials, for example, other hydrocarbons or substituted hydrocarbons which are essentially inert to diborane. Ordinarily the amount of diborane employed is equivalent to or less than the stoichiometric amount required to react with the α-olefin contained in the mixture. For best results between about 0.5 to 1 theory of diborane for reaction with the α-olefin is employed. The mixtures of olefins are not critical but are preferably rich in α-olefin, that is, containing at least 1 mole of α-olefin per mole of internal olefin contained in the mixture. The process is particularly applicable to mixtures containing straight chain hydrocarbon olefins having up to about 10 carbon atoms. Thus a particularly preferred embodiment of this invention is the reaction of diborane with a mixture of internal and α-hydrocarbon olefins having up to about 10 carbon atoms at a temperature between about 25–50° C.

The process is advantageous over the prior art techniques of treating mixtures of internal and α-olefins in that, for the first time, the internal olefin remains as a separated product while simultaneously the α-olefin is employed in producing the useful organo borane products. Thus the process serves a dual function. Further, the hydrocarbon stream from which the α-olefin has been removed is of higher antiknock quality because of its higher octane, greater stability and resistivity to gum formation. Other benefits of the invention will be evident hereinafter.

The mixture of olefins will comprise α- or terminal and internal olefins. Among the α-olefins included are, for example, ethylene, propylene, 1-butene, 1-pentene, 1 octene, 1-hexene, 2-methyl-1-pentene, 3-methyl-1-pentene, 1-diisobutylene, 1-decene, 1-tetradecene, 1-octadecene; 1,1-diphenylethylene, styrene, and the like. The internal olefins include, for example, 2-pentene, 3-hexene, 2-hexene, 2-methyl-2-pentene, 2-methylstyrene, 3-octene, 4-octadecene, cyclopentene, cyclohexene, cycloheptene, 1,2-diphenyl ethylene, and the like. In general, the olefins contained in the mixture will contain up to about 30 carbon atoms. The process is especially applicable to mixtures containing olefins having up to about 18 carbon atoms and preferably hydrocarbon olefins containing up to 10 carbon atoms. Particularly preferred mixtures are those containing any one or all of the following terminal olefins: ethylene, propylene, 1-butene, 1-hexene, 1-pentene and any or all of the following internal olefins: 2-butene, 2-pentene, 2-hexene, 2-octene and 2-decene. Such mixtures can also contain other ingredients which are essentially inert to diborane.

The diborane can be prepared by any technique as for example the reaction of lithium hydride or alkali metal borohydride with a boron halide.

The process of this invention is further demonstrated by the following examples wherein all parts are by weight unless otherwise designated.

*Example I*

To a reactor equipped with external heating and cooling means, internal agitation and means for introducing and discharging reactants and products was added a mixture of 0.3 mole of 1-hexene and 0.3 mole of 2-hexene dissolved in 95 parts of the dimethyl ether of diethylene glycol. This mixture was treated at room temperature by bubbling through, with agitation, 0.06 mole of diborane. In this instance a 20 percent excess of diborane over that required to react with the amount of 1-hexene present was employed. The treatment was conducted at room temperature and was essentially instantaneous. In order to determine the effectiveness of the treatment, the mixture was subjected to oxidation with hydrogen peroxide. Analysis of the resulting mixture showed 2.3 parts of 2-hexanol and 30.1 parts of 1-hexanol thus demonstrating the preferential reaction of the diborane with the 1-hexene.

In order to illustrate the greater effectiveness of the process when employing the stoichiometric or less than the stoichiometric amount of diborane required to react with the α-olefin contained in the mixture, the following run was made.

*Example II*

Employing the procedure of Example I, a mixture of 0.2 mole of 1-hexene and 0.2 mole of 2-hexene in 50 parts of the dimethyl ether of diethylene glycol was treated with 25 millimoles of diborane at room temperture for 2 hours. The organoboron compound formed after separation from unreacted olefin was oxidized and the alcohol thus formed fractionated. 1- hexanol was recovered in 90 percent yield reflecting that 90 percent of the 1-hexene was removed from the mixture with 2-hexene. Less than 10 percent of 2-hexanol was obtained.

The amount of internal olefin reacted with the diborane in the above example is further diminished by employing a shorter reaction period. In this connection the benefits of this invention are realized when contact between the diborane and the mixture of olefins at the designated temperatures is maintained for periods between about 5 minutes to 10 hours. Preferred operating times are between about 5 minutes to 1 hour, in order to more effectively accomplish the separation of the 1-olefins from the internal olefins.

*Example III*

When repeating Example II but employing 60 and 40 percent of the amount of diborane required to react with the mixture of 1-hexene and 2-hexene, 90 percent separation of the α-olefin from the internal olefin was obtained in each instance.

*Example IV*

A mixture of 3 moles of 1-pentene and 3 moles of 2-pentene is reacted with 0.5 mole of diborane according to the procedure of Example I at 50° C. for ½ hour in 50 parts of tetrahydrofuran. An essentially quantitative conversion to tri-n-pentyl boron is obtained with essentially no reaction of the diborane with 2-pentene.

*Example V*

A petroleum distillate stream containing mixtures of both terminal (1-) and internal olefins (2-, 3-, 4-, etc.) in the C–8 range in amount up to 30 percent by weight and the remainder being saturated hydrocarbons in the same volatility range is reacted with diborane for 60 minutes at 100° C., sufficient diborane being utilized to react with the terminal olefin. The organoboron products are removed by distillation. The unreacted hydrocarbons are essentially free from terminal olefins as shown by infrared analysis. The organoborane residue is oxidized with alkaline hydrogen peroxide. The product is essentially pure primary octyl alcohol with only minor amounts of secondary alcohol.

*Example VI*

The procedure of Example V is repeated with exception that the stream also contains 1 percent by weight of the dimethyl ether of diethylene glycol and the treatment is conducted at 50° C. for 15 minutes. Upon subjecting the resulting mixture to distillation an essentially pure residue of tri-n-octyl boron and an overhead essentially free of terminal olefins are obtained.

In place of the mixture of olefins employed in the above examples one can substitute mixtures containing the olefins designated heretofore with equal results.

In general, the reaction is conducted at atmospheric pressure. However, if desired, pressures above atmospheric can be employed in order to increase the reaction rate. Such pressures can be as high as about 50 atmospheres although atmospheric up to about 25 atmospheres are generally employed.

Certain of the above examples have shown the employment of diluents or solvents. It is to be understood that such are not ordinarily required. However, if desired, diluents including hydrocarbons, both aliphatic and aromatic, halogen aromatic compounds, ethers, thioethers, nitroalkanes and nitroaromatics, and tertiary amines can be employed. Among such diluents are included the hexanes, nonanes, decanes, cyclohexanes, benzene, toluene, diethyl ether, diamyl ether, methyl amyl ether, tetrahydrofuran, dioxane, the diethyl, dimethyl and methyl ethyl ethers of ethylene glycol, diethylene glycol, triethylene glycol, and tetraethylene glycol, and the corresponding thioethers, phenyl chloride, tolyl bromide, trimethyl amine, triethyl amine, tributyl amine, methyl pyridine, pyridine, alkylpyridine, amyl nitrite, nitro pentane, hexyl nitrite, phenyl nitrite, nitro benzene, and the like. The ethers, particularly tetrahydrofuran and the polyethers, such as the dimethyl ether of diethylene glycol, and methyl ethyl ether of diethylene glycol are especially preferred because of their greater solubility for the reactants and products. Additionally, such ethers exhibit a catalytic or reaction promoting effect and even shorter reaction times are required when such are employed. The proportions of the diluents employed can be varied over a wide range. In a preferred operation between about 3 to 50 parts of diluent per part of the α-olefin are employed.

The products produced according to the process of this invention are of considerable utility. As demonstrated in certain of the above examples, the organoboron product can be oxidized and hydrolyzed to produce the corresponding alcohol. For example, oxidation of tri-n-hexylboron and hydrolysis of the product results in n-hexyl alcohol. They are likewise useful in the formation of catalytic compositions with metal halides, for example triethylboron and titanium tetrachloride, which are useful in the polymerization of olefins. Likewise the internal olefins separated from the α-olefins are also useful as solvents and in reaction with diborane under more rigorous conditions produce secondary and/or tetriary alkyl organoboron compounds which then can be converted to secondary or tertiary alcohols. A particular use of a petroleum hydrocarbon stream from which the α-olefins have been removed is as a fuel for internal combution engines.

Having thus described the process of this invention it is not intended that it be limited except as set forth in the following claims.

I claim:

1. The process for the simultaneous preparation of a primary hydrocarbon boron compound and separation of α-olefins from internal olefins which comprises reacting diborane with α-olefins in a mixture of internal and α-olefins.

2. The process of claim 1 wherein the reaction is conducted at a temperature between about 25 to 50° C.

3. The process of claim 2 wherein the reaction is conducted in the presence of a saturated hydrocarbon ether.

4. A process for the simultaneous preparation of tri-n-octylboron and separation of 1-octene from 2-, 3-, and 4-octenes which comprises reacting a mixture of 1-octene and 2-, 3-, and 4-octenes with diborane at a temperature between about 25 to 50° C. in the presence of the dimethyl ether of diethylene glycol.

5. The process of claim 3 wherein the amount of diborane employed is up to about the stoichiometric amount required to react with the alpha-olefin contained in said mixture.

6. The process of claim 4 wherein the diborane is employed in amount up to about the stoichiometric amount required to react with the 1-octene.

7. A process for the simultaneous preparation of tri-n-hexylboron and separation of 1-hexene from 2-hexene which comprises reacting a mixture of 1-hexene and 2-hexene with diborane at a temperature between 25 to 50° C. in the presence of the dimethyl ether of diethylene glycol, said diborane being employed in essentially the stoichiometric amount required to react with the 1-hexene contained in said mixture.

References Cited in the file of this patent

Hurd: J. Am. Chem. Soc., vol. 70, pp. 2053–5 (1948).